United States Patent Office 3,540,216
Patented Nov. 17, 1970

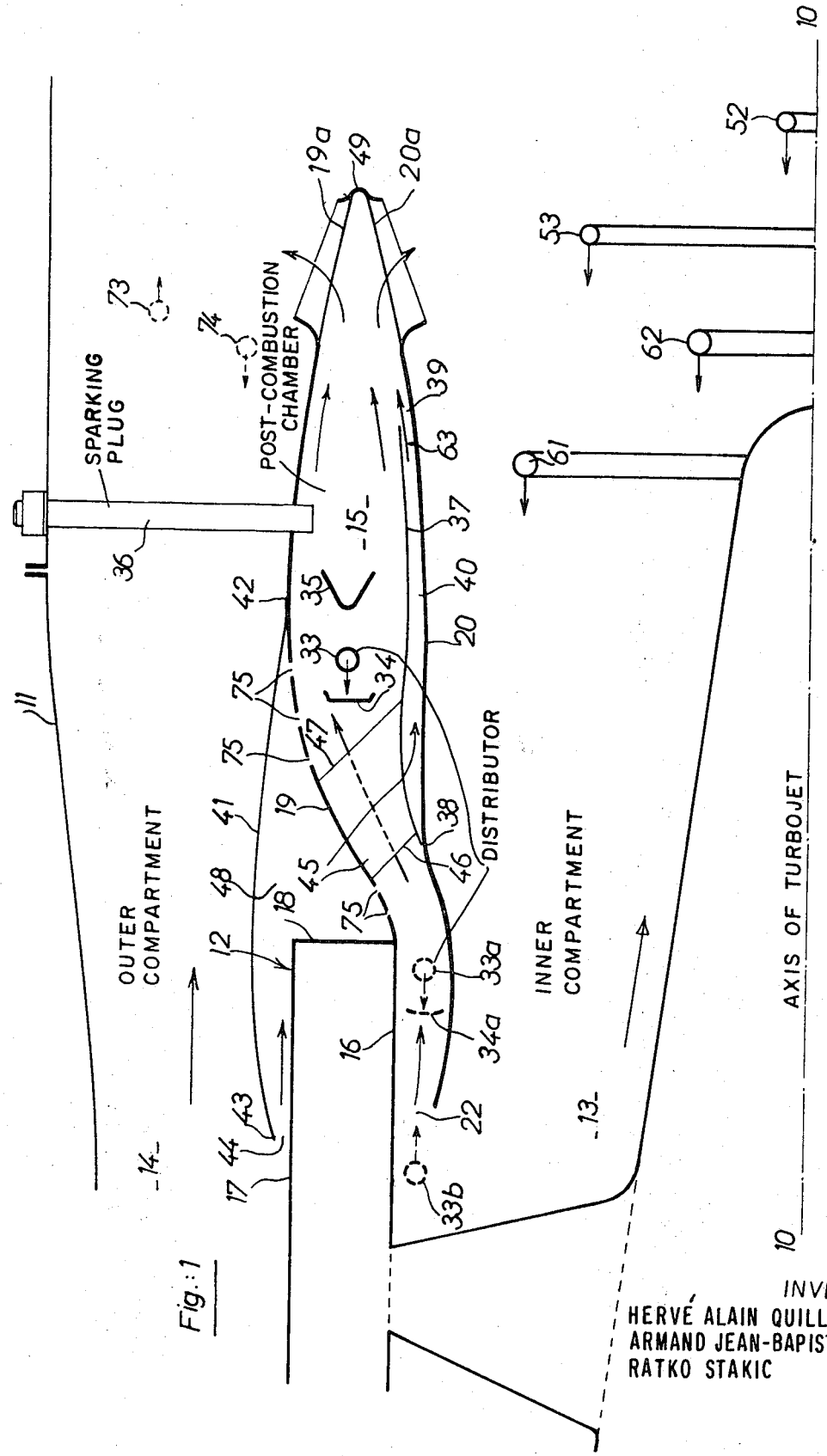

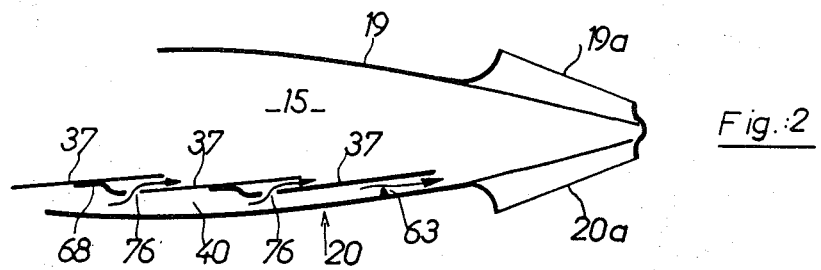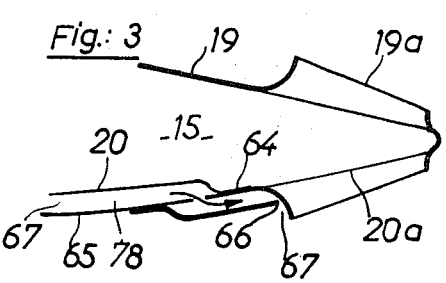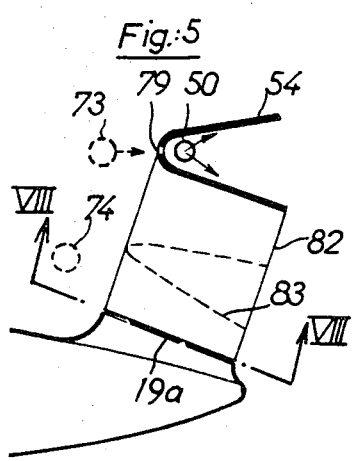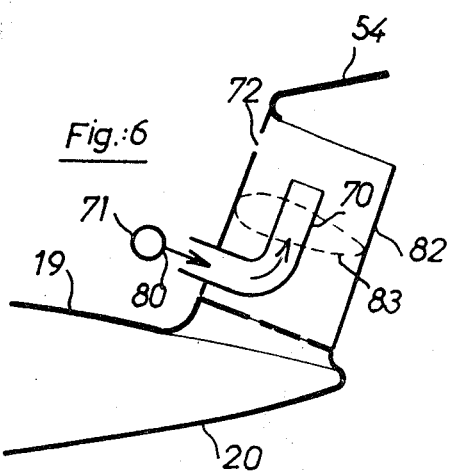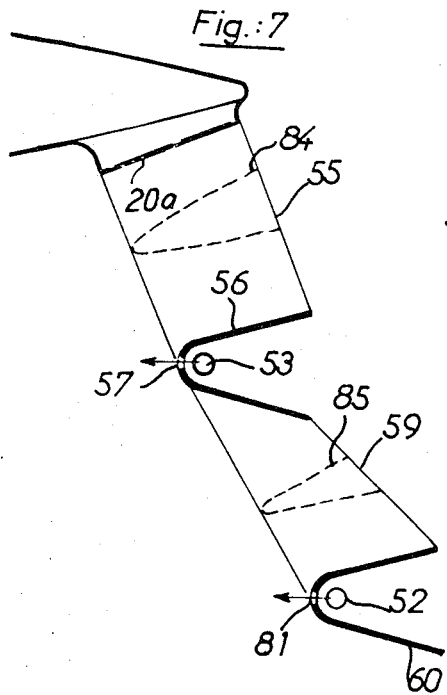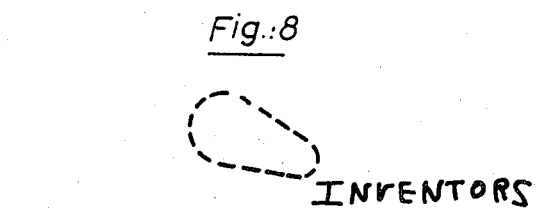

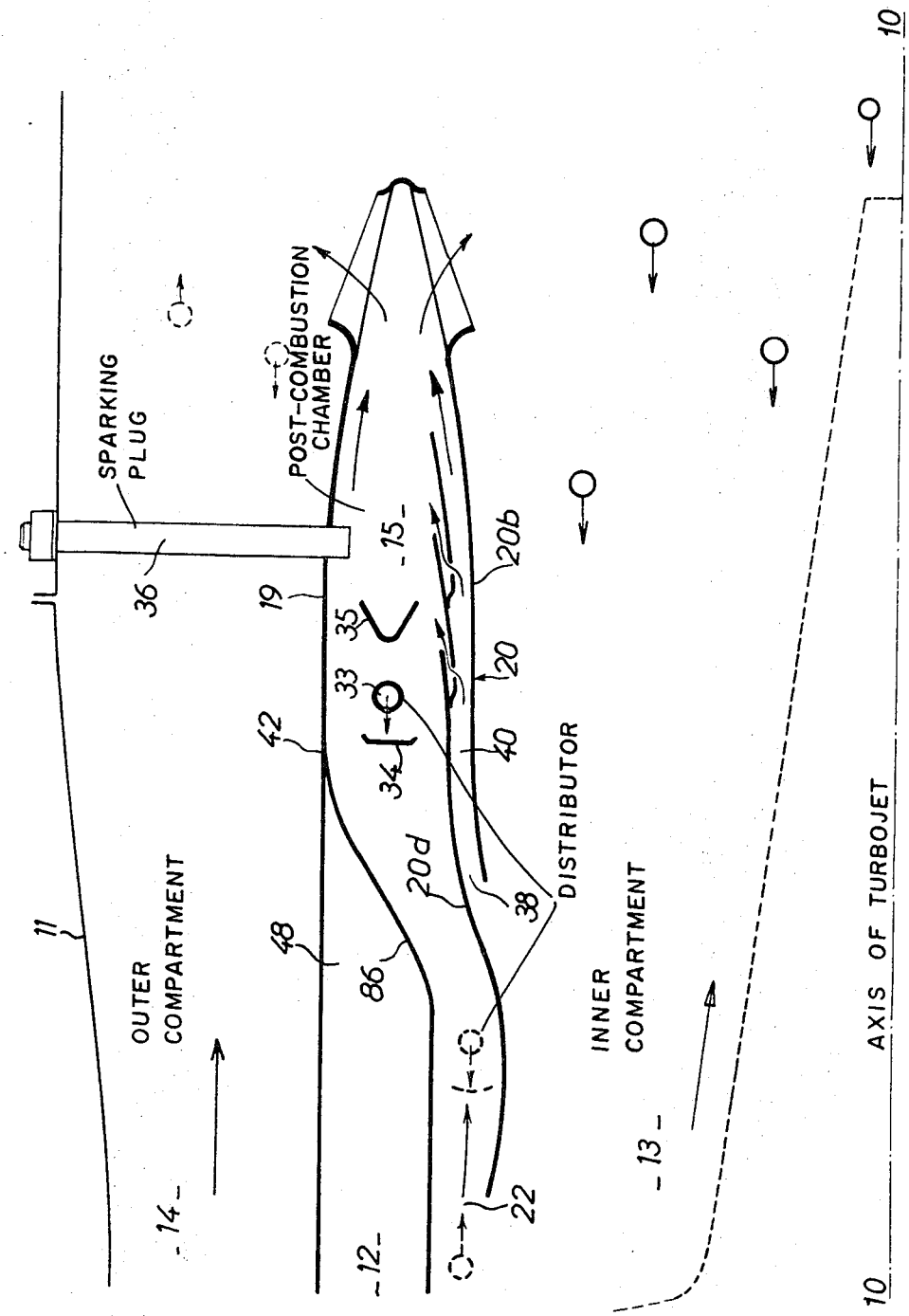

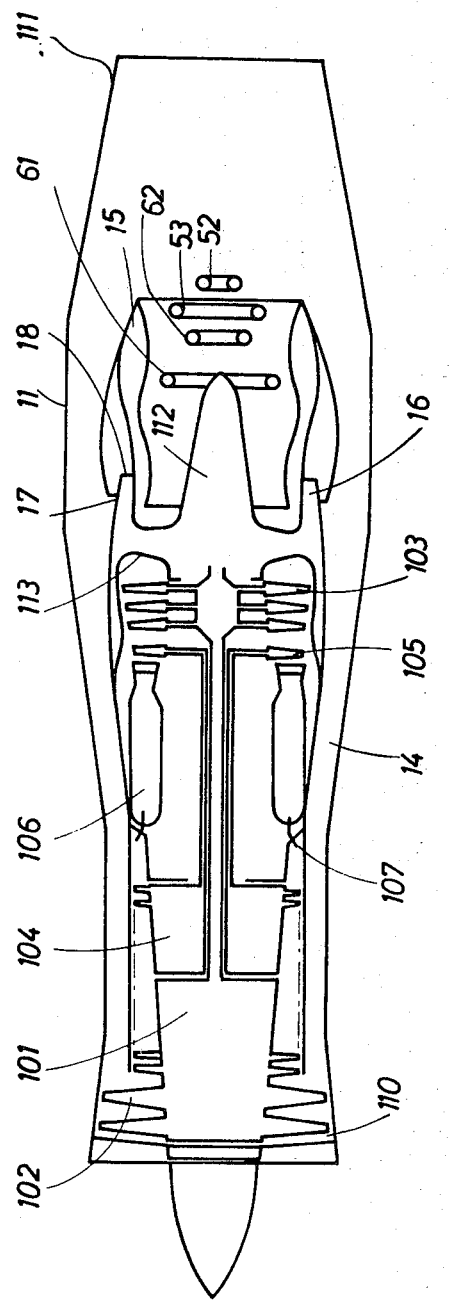

3,540,216
TWO-FLOW GAS TURBINE JET ENGINE
Hervé Alain Quillevere, Issy-les-Moulineaux, Armand Jean-Baptiste Lacroix, Itteville, and Ratko Stakic, Sucy-en-Brie, France, assignors to Societe Nationale d'Etude et de Construction de Moteurs d'Aviation, Paris, France
Filed Jan. 22, 1968, Ser. No. 699,409
Claims priority, application France, Jan. 23, 1967, 92,174
Int. Cl. F02k 3/10
U.S. Cl. 60—39.72    11 Claims

ABSTRACT OF THE DISCLOSURE

The turbo-jet is provided with annular means extending axially of the inner chamber of the turbo-jet and separating an inner compartment through which oxygen-containing gases flow from an outer compartment through which air flows and the downstream section of said separating means forms the post-combustion chamber open at its upstream and downstream ends to operate thus under optimum conditions. Said chamber is advantageously fed with a fraction of the hot gases passing out of the inner compartment and the partition bounding said chamber inwardly is cooled by the air from the outer compartment.

---

Our invention relates to a two-flow gas turbine jet engine operating with hot gas and cold air fluxes allowing a post-combustion for both fluxes under good operative conditions.

Our improved turbo-jet includes, as well known in the art, annular separating means subdividing the inner volume of the two-flow gas turbine jet engine into an inner compartment through which a hot stream of oxygen-containing gases flows and an outer compartment through which a stream of air flows.

According to our invention, the downstream section of the annular separating means is constituted by a fraction at least of an annular pilot post-combustion chamber open at its upstream and downstream ends. The chamber is preferably fed by a fraction of the hot gases passing out of the inner compartment, while the inner wall of the chamber is preferably cooled along its inner surface, its outer surface or both its surfaces by cold air passing out of the outer compartment.

The following description referring to the accompanying drawings shows by way of example and in a non-limiting sense how the invention can be executed. In said diagrammatic drawings:

FIG. 1 is a half axial longitudinal cross-section of an embodiment of a portion of our improved turbo-jet, including the post-combustion chamber.

FIGS. 2 to 7 illustrate various modifications of the chamber illustrated in FIG. 1.

FIG. 8 is a cross-section through line VIII—VIII of FIG. 5.

FIG. 9 is on a smaller scale an axial longitudinal cross-section of a turbo-jet according to our invention.

Except for certain parts to be mentioned hereinafter, all the parts described in the present specification are of revolution round the operative axis of the turbo-jet.

In FIG. 1, 10—10 designates the operative axis of the turbo-jet, 11 its outer casing and 12 the upstream section of means separating the inner volume of the turbo-jet into an inner compartment 13 and an outer compartment 14. This upstream section 12 includes an inner partition 16, an outer partition 17 and the two partitions 16 and 17 are interconnected at their downstream ends by a transverse partition 18. Hot gases flow through the inner compartment 13, while cold air flows through the outer compartment 14.

The upstream section 12 is connected (see FIG. 9) by arms 113 with the conventional junction suction cone 112 extending on the downstream side of the turbine of the turbo-jet.

The inner partition 16 of the upstream section 12 of the separating means is followed by the outer partition 19 of a post-combustion chamber 15 forming the downstream section of the separating means. 20 designates the inner partition of said chamber 15. The downstream portion of the upstream section of the separating means surrounds the upstream portion of the partition 20 and a gap 22 separates the upstream end of the partition 20 from the downstream end of the partition 16, whereby the chamber 15 is open at its upstream end. The gap between the partition 20 and the partition 16 and then between the partition 20 and the upstream portion of the outer partition 19 increases downstream starting from the input of the chamber 15, so that the cross-sectional area of the latter increases gradually starting from the upstream entrance of the chamber throughout the upstream portion of the latter.

The chamber 15 encloses a tubular distributor 33 feeding and distributing fuel and the perforations of which provide exits for the latter.

Said perforations face upstream. A narrow baffle plate 34 extends in registry with said perforations and furthers the atomization of the fuel. On the downstream side of the tubular distributor 33 there is located a flame-stabilizing trough 35 the cross-section of which in a dimetrical plane is in the shape of a V the apex of which faces the distributor 33. A sparking plug 36 extends radially into the chamber 15 on the downstream side of the trough 35.

The outer partition 19 joins the inner partition 20 at the common downstream end 49 of said partitions and ports to which is given for instance the shape illustrated in FIG. 8 are provided in the downstream sections 19a and 20a of the outer and inner partitions 19 and 20 respectively of the chamber 15.

The preceding disclosure shows that the turbo-jet encloses means through which it is possible to introduce and distribute a liquid fuel inside the chamber 15 to ignite said fuel, to stabilize the flame and to project the latter through the downstream end of the chamber into the inner and outer compartments.

Thus, the chamber 15 forms a pilot post-combustion chamber for the fuel mixtures passing through the inner and outer compartments.

The tubular distributor 33 and baffle plate 34 located on the downstream end of the upstream separating section 12 may be replaced by or associated with a tubular distributor 33a the perforations of which are directed upstream towards a baffle plate 34a and which is located in the part of the chamber 15 which is surrounded by the downstream part of the section or else a tubular distributor 33b the perforations in which are directed downstream and which is located ahead of the chamber 15 in registry with the upstream opening 22 thereof may be used.

The tubular distributors may also be provided with injectors of the eddying type injecting fuel outside the flame stabilizer, in particular in the case where the V-shaped stabilizer 35 is replaced by a more complex stabilizer.

37 designates an inner sleeve which starts at its upstream end 38 from the inner periphery of the partition 20 and extends inside the chamber 15 in substantial parallelism with said partition, said sleeve terminating at its downstream end 39 inside the chamber 15, said sleeve 37 and partition 20 defining thus together an inner chamber 40 the downstream end of which is open. 41 designates a further sleeve extending outside the chamber 15 and starting at its downstream end 42 from the outer periphery of the chamber 15 and the upstream end of which 43 surrounds the downstream part of the upstream separating section 12, while a gap 44 is left between said upstream end 43 of the sleeve 41 and said upstream section 12. Consequently, the upstream part of the partition 19, the sleeve 41 and said upstream separating section 12 define together a first outer chamber 48 the upstream end of which is open. Several separate oblique channels 45 are directed downstream towards the operative axis 10–10 across the chamber 45, so as to connect the first-mentioned outer chamber 48 with the inner chamber 40. 46 and 47 designate the two generating lines forming in the plane of FIG. 1 the outline of the channel 45. Cold air passes thus through the opening 44, the outer chamber 48, the chamber 45 and the chamber 40 and cools thus the inner partition 20. An adjustable diaphragm 63 ensures the adjustment of the throughout of said cold air.

The part of the wall 19 bounding the chamber 48 is provided with ports 75 so as to allow introducing cold air into the chamber 15.

It is also possible to introduce cold air into the flame stabilizer 35 or into other parts to be cooled.

In the embodiment illustrated in FIG. 2, the inner sleeve 37 is provided with ports 76 in a manner such that the cold air passing inwardly through said ports 76 forms on the inner surface of the sleeve 37 a cooling film flowing downstream.

It may occur that the pressure of the cold air in the outer compartment 14 is too low for it to pass in succession through the chamber 48, the channels 45 and the chamber 40. In such a case, instead of cooling the inner surface of the partition 20, it is possible to cool its outer surface. Such a modification forms the object of FIG. 3 showing a second sleeve 65 extending outside the chamber 15, starting at its upstream end which is not illustrated from the periphery of the partition 20, said sleeve 65 being substantially parallel with the partition 20, while its downstream end 66 forms a gap 67 with the latter. Thus, the partition 20 and sleeve 65 define together a second external chamber 78 which is open at its downstream end. The oblique channels 45 of FIG. 1 extend in succession in this case through the partitions 19–20 to connect the first outer chamber 48 with the second outer chamber 78.

The embodiment illustrated in FIG. 4 shows the following features: the oblique channels 45 of FIG. 1 are cut out and the upstream and downstream sections of the separating means are divided from each other solely by the solid partition 86, while the inner partition 20 of the downstream chamber 15 includes an upstream section 20d and a downstream section 20b which are separate from each other and overlap each other, the former lying further from the axis 10–10 being similar to the inner sleeve 37 of FIG. 2. The inner partition 20 is thus cooled no longer by the air passing out of the outer compartment 14, but by the combustion gases passing out of the inner compartment 13.

Tubular distributors 73 and 74 (FIG. 1), the perforations of which are directed upstream or downstream extend inside the outer compartment 14, while the flame passing out of the chamber 15 allows igniting the fuel mixture flowing through the downstream part of the compartment 14.

Similarly, tubular distributors 52, 53, 61, 62 of which the openings are directed upstream are located in the downstream part of the inner compartment 13 or in the downstream extension thereof. The tubular distributors 61 and 62 are housed inside the actual inner compartment 13, while the position of the tubular distributors 53 and 52 register substantially with the downstream end 20a of the partition 20, and their distances with reference thereto are different. The flame passing out of the chamber 15 ensures the ignition of the fuel mixture flowing through the downstream part of the compartment 13 and beyond the latter.

FIG. 5 illustrates an embodiment of the turbo-jet wherein a hollow radial arm 82 directed outwardly starts from each port at 19a to the edge of which it is welded, said hollow arm opening at its outer end into a flame-stabilizing trough 54 which is notched to this end and its cross-section is in the shape of a rounded V the central convex portion of which faces upstream. The apex of the V is located downstream with reference to the tubular distributor 73, the trough being provided along its ridge passing through said apex with ports 79 and enclosing a further tubular distributor 50 the perforations of which face downstream. The outline of the hollow arm 82 is open as illustrated at 83 by an interrupted line, but said outline may as well be closed.

In the embodiment illustrated in FIG. 6, each hollow radial arm 82 encloses a bent tube 70 of which the downstream section extends in parallelism with the arm 82 towards the trough 54, while its upstream section is perpendicular to said arm and extends out of the latter substantially axially and into registry with the tubular distributor 71 the perforations 80 of which face the bent tube 70. Each hollow radial arm 82 is provided, downstream with reference to the downstream section of the bent tube 70 with a port 72 facing upstream and through which a fraction of the cold air passes out of the outer compartment 14 into said bent tube. This arrangement forms a pilot post-combustion relay. The outline 83 of the arm 82 has been illustrated as closed in the case of FIG. 6, but it may be as well open.

In the embodiment illustrated in FIG. 7, two flame-stabilizing troughs 56 and 60 similar to the trough 54 and provided with perforations facing upstream, 57 and 81 respectively, surround the tubular distributors 53 and 52 respectively.

A first hollow oblique arm 55 directed downstream towards the operative axis 10—10 extends through the downstream section 20a of the partition 20 and the inner arm of the trough 56, so as to connect the chamber 15 with the inside of the trough 56. A second hollow oblique arm 59 connects the inside of the trough 56 with the inside of the trough 60. As precedingly, the outlines 84 and 85 of the arms 55 and 59 may be open as illustrated or else closed.

In our improved turbo-jet, the pilot flame allows cutting out the stabilizing troughs (FIGS. 5 and 6) conventionally used or else, if such stabilizers are retained, their transverse size may be reduced and consequently their number may be increased while the length of the flame may be reduced together with its trail. Similarly, if one continues using stabilizers such as 56 and 60 (FIG. 7) in the inner compartment 13 which is swept by hot gases, it is possible to reduce their trail. If ports provided at the downstream end of the section 20a of the inner partition 20 open directly into the inner compartment 13, the gas escaping through said ports produces a turbulence which furthers the mixture of the hot gas with cold air.

The Mach number inside the chamber 15 can be brought down to a reduced figure by giving a suitable value to the gaps 22 and 44 and to the actual chamber 15. Furthermore, the latter is fed with gases at a high temperature whereby a good stabilization of the combustion in the cold air is obtained.

In FIG. 9, 101 is a multi-stage low pressure compressor which is preceded by an inlet fan 102, the assembly being driven by a multistage low pressure turbine 103 while a mustistage high pressure compressor 104 is driven by the single-stage high pressure turbine 105. Between the compressor and turbine sections, there is located an annular combustion chamber 106, which is provided with fuel injectors 107. The gas generator comprising the central portion of the inlet fan 102, the low and high pressure compressors 101 and 104, the combustion chamber 106 and the low and high pressure turbines 103 and 105 is surrounded by an external casing 11 which provides an air inlet 110 and a nozzle 111 for the by-pass turbo-jet. The peripheral portion of the vanes of the inlet fan 102 provides air flow in the annular passage 14 between the gas generator and the external casing 11. The reference characters of FIG. 9 which are already present in FIG. 1 designate the same parts as in FIG. 1.

What we claim is:

1. In a two-flow turbojet engine having two generally coaxial flow-paths: an inner hot-gas flow path and an outer cool-air flow path separated by a generally coaxial annular partition structure which extends longitudinally in said engine, a protected pilot flame igniter device comprising a longitudinally-elongate and transversely-narrow annular combustor (15) incorporated in said partition structure (12) to form a trailing extension thereof and having two radially spaced annular walls: an inner wall (20) exposed to said hot-gas flow (13) and an outer wall (19) exposed to said cool-air flow (14), fluid intake means (22, 44) positioned at an upstream end section of said combustor adjacent said partition structure for tapping fluid from at least one of said flows and supplying the tapped fluid to said combustor, and flame discharge means (19a, 20a) positioned at a downstream end section of said combustor for issuing a flame from said combustor into at least one of said flows.

2. Turbojet engine as claimed in claim 1, wherein said partition structure (12) comprises an inner side (16) exposed to said hot-gas flow (13), and said combustor outer wall (19) is connected to and forms a rear extension of said partition inner side.

3. Turbojet engine as claimed in claim 2, wherein said combustor inner wall (20) comprises a leading end extension radially spaced from said partition inner side (16) in inwardly overlapping relation therewith, said leading end extension and said partition inner side defining together a hot-gas scoop (22) integrated in said fluid intake means.

4. Turbojet engine as claimed in claim 3, wherein said combustor outer and inner walls (19, 20) comprise divergent opposite portions which define together an annular diffuser section into which said hot-gas scoop (22) leads.

5. Turbojet engine as claimed in claim 1, wherein said combustor outer wall (19) comprises an outer jacket (41) which projects therefrom and defines therewith a cool-air scooping chamber (48) integrated in said fluid intake means, and passage means (45, 75) for interconnecting the interior of said combustor (15) with said cool-air scooping chamber.

6. Turbojet engine as claimed in claim 5, wherein said passage means comprise ports (75) formed through said combustor outer wall (19) at a bottom region of said cool-air scooping chamber (48).

7. Turbojet engine as claimed in claim 5, wherein said partition structure (12) comprises an outer side (17) exposed to said cool-air flow (14), and said outer jacket (41) comprises a leading end extension (43) radially spaced from said partition outer side in outwardly overlapping relation therewith, said leading end extension and said partition outer side defining together a cool-air scoop (44) leading into said chamber (48).

8. Turbojet engine as claimed in claim 1, wherein said combustor (15) further comprises a jacket (37, 65) defining with said combustor inner wall (20) a sheet-like space (40, 67), and cool-air scooping duct means (48-45) extending through said combustor and connecting said sheet-like space with said cool-air flow path (14), whereby said space is supplied with cool air scooped from said cool-air flow path to cool said combustor inner wall.

9. Turbojet engine as claimed in claim 8, wherein said jacket (37, 65) comprises tangential nozzles (76, 66) formed therethrough for tapping cool air from said sheet-like space (40, 67) on one side of said jacket and delivering said tapped cool air tangentially on the other side thereof.

10. Turbojet engine as claimed in claim 1, wherein said combustor inner wall (20) comprises an upstream section (20d) and a downstream section (20b) separate from each other and having respective portions extending from each other and having respective portions extending opposite each other in mutual overlapping relation, the portion belonging to said upstream section being radially spaced outward from the portion belonging to said downstream section, said portions defining together a duct (40) having an inlet (38) opening into said hot-gas flow path (13) and an outlet opening into the interior of said combustor (15).

11. Turbojet engine as claimed in claim 10, wherein said portion of said upstream wall section (20d) comprises tangential nozzles formed therethrough for tapping fluid from said duct (40) on one side of said upstream wall section and delivering said tapped fluid tangentially on the other side thereof.

References Cited
UNITED STATES PATENTS

| | | | |
|---|---|---|---|
| 2,832,402 | 4/1958 | Jurisich | 60—39.82 |
| 3,269,114 | 8/1966 | Marchant | 60—226 |
| 2,588,532 | 3/1952 | Johnson | 60—262 |
| 2,744,384 | 5/1956 | Looghran | 60—39.72 |
| 2,944,399 | 7/1960 | McCardle et al. | 60—39.82 |
| 2,978,868 | 4/1961 | Puffer | 60—39.72 X |
| 3,056,261 | 10/1962 | Krabacher et al. | 60—39.72 |
| 3,295,325 | 1/1967 | Nelson | 60—261 |

FOREIGN PATENTS

| | | |
|---|---|---|
| 1,086,315 | 8/1954 | France. |

DOUGLAS HART, Primary Examiner

U.S. Cl. X.R.

60—39.82, 261